(12) United States Patent
Cheng et al.

(10) Patent No.: US 12,152,771 B1
(45) Date of Patent: Nov. 26, 2024

(54) OPTICAL STRUCTURE

(71) Applicant: Lextar Electronics Corporation, Hsinchu (TW)

(72) Inventors: Wei-Chung Cheng, Hsinchu (TW); Yun-Yi Tien, Hsinchu (TW); Jung-Cheng Chang, Hsinchu (TW); Min-Chen Chiu, Hsinchu (TW)

(73) Assignee: Lextar Electronics Corporation, Hsinchu (TW)

( * ) Notice: Subject to any disclaimer, the term of this patent is extended or adjusted under 35 U.S.C. 154(b) by 0 days.

(21) Appl. No.: 18/424,209

(22) Filed: Jan. 26, 2024

(51) Int. Cl.
*F21V 5/00* (2018.01)
*F21V 9/30* (2018.01)
*F21Y 115/10* (2016.01)
*G02F 1/13357* (2006.01)

(52) U.S. Cl.
CPC .............. *F21V 5/002* (2013.01); *F21V 9/30* (2018.02); *F21Y 2115/10* (2016.08); *G02F 1/133606* (2013.01)

(58) Field of Classification Search
CPC . F21V 5/002; F21V 5/005; F21V 9/30; G02F 1/133606
USPC ...................................................... 362/311.02
See application file for complete search history.

(56) References Cited

U.S. PATENT DOCUMENTS

| | | | | |
|---|---|---|---|---|
| 8,007,138 B2* | 8/2011 | Bamba | ...... | F21V 7/22 |
| | | | | 362/311.06 |
| 8,956,010 B2* | 2/2015 | Huang | ...... | F21V 5/007 |
| | | | | 362/249.02 |
| 11,575,073 B2 | 2/2023 | Okahisa et al. | | |
| 2019/0280174 A1* | 9/2019 | Okahisa | ...... | H01L 27/156 |
| 2021/0071837 A1* | 3/2021 | Owoc | ...... | F21V 31/005 |
| 2021/0071843 A1* | 3/2021 | Palm | ...... | F21V 5/045 |

FOREIGN PATENT DOCUMENTS

| | | |
|---|---|---|
| CN | 112558213 A | 3/2021 |
| CN | 212694217 U | 3/2021 |
| CN | 112289913 B | 9/2021 |
| CN | 217334128 U | 8/2022 |
| CN | 217768374 U | 11/2022 |

* cited by examiner

*Primary Examiner* — Laura K Tso
(74) *Attorney, Agent, or Firm* — Patterson + Sheridan, LLP

(57) ABSTRACT

An optical structure is provided. The optical structure includes a substrate and a light-emitting element disposed on the substrate. The optical structure also includes a cap disposed on the substrate and covering the light-emitting element. The cap has a top portion and a sidewall connected to the top portion. The optical structure further includes a first micro-structure disposed on a first side of the top portion facing the light-emitting element. The first micro-structure is periodically arranged.

19 Claims, 14 Drawing Sheets

OPTICAL STRUCTURE

BACKGROUND OF THE INVENTION

Field of the Invention

The present disclosure relates to an optical structure, and in particular, it relates to an optical structure that includes at least one micro-structure.

Description of the Related Art

Light-emitting diodes (LEDs) have the characteristics of being compact and having high light directivity. For applications that require a uniform illuminance from the light-emitting surface of the light source (e.g., the backlight module of a liquid crystal display), when the LED light sources are arranged in a periodic array, any increase in the spacing between the LED light sources may lead to uneven lighting on the light-emitting surface of the light source. Therefore, there is a need to develop an optical structure to alter the light that is emitted by the LED light sources so that when the space between LED light sources increases, the beam angle of each LED light source may simultaneously widen to achieve light uniformity. However, when the size of the optical components is scaled down to be close to that of LEDs, LEDs can no longer be considered as point light sources. Therefore, it is necessary to take into account the impact of the different emitting portions of the LED on the optical components, which makes the design more challenging.

BRIEF SUMMARY OF THE INVENTION

An embodiment of the present disclosure provides an optical structure. The optical structure includes a substrate and a light-emitting element disposed on the substrate. The optical structure also includes a cap disposed on the substrate and covering the light-emitting element. The cap has a top portion and a sidewall connected to the top portion. The optical structure further includes a first micro-structure disposed on a first side of the top portion facing the light-emitting element. The first micro-structure is periodically arranged.

BRIEF DESCRIPTION OF THE DRAWINGS

Aspects of the embodiments of the present disclosure can be understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1:
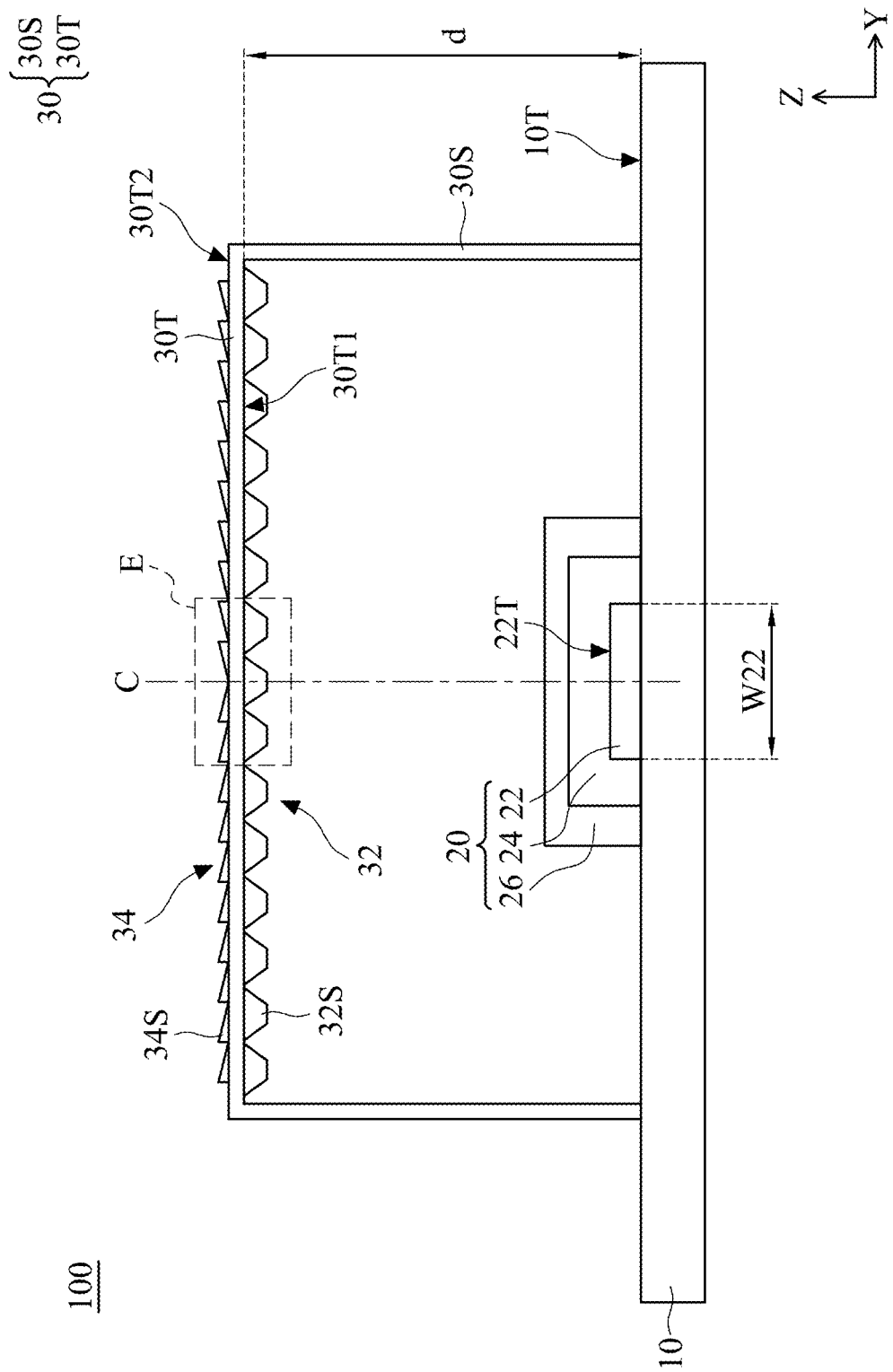
FIG. 1 is a cross-sectional view illustrating an optical structure according to some embodiments of the present disclosure.

The following description is made for the purpose of illustrating the general principles of the invention and should not be taken in a limiting sense. The scope of the invention is best determined by reference to the appended claims.

The following disclosure provides many different embodiments, or examples, for implementing different features of the subject matter provided. Specific examples of components and arrangements are described below to simplify the present disclosure. These are, of course, merely examples and are not intended to be limiting. For example, a first feature is formed on a second feature in the description that follows may include embodiments in which the first feature and second feature are formed in direct contact, and may also include embodiments in which additional features may be formed between the first feature and second feature, so that the first feature and second feature may not be in direct contact.

It should be understood that additional steps may be implemented before, during, or after the illustrated methods, and some steps might be replaced or omitted in other embodiments of the illustrated methods.

Furthermore, spatially relative terms, such as "beneath," "below," "lower," "on," "above," "upper" and the like, may be used herein for ease of description to describe one element or feature's relationship to other elements or features as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In the present disclosure, the terms "about," "approximately" and "substantially" typically mean +/−20% of the stated value, more typically +/−10% of the stated value, more typically +/−5% of the stated value, more typically +/−3% of the stated value, more typically +/−2% of the stated value, more typically +/−1% of the stated value and even more typically +/−0.5% of the stated value. The stated value of the present disclosure is an approximate value. That is, when there is no specific description of the terms "about," "approximately" and "substantially", the stated value includes the meaning of "about," "approximately" or "substantially".

Unless otherwise defined, all terms (including technical and scientific terms) used herein have the same meaning as commonly understood by one of ordinary skill in the art to which this disclosure belongs. It should be understood that terms such as those defined in commonly used dictionaries should be interpreted as having a meaning that is consistent with their meaning in the context of the relevant art and will not be interpreted in an idealized or overly formal sense unless expressly so defined in the embodiments of the present disclosure.

The present disclosure may repeat reference numerals and/or letters in following embodiments. This repetition is for the purpose of simplicity and clarity and does not in itself dictate a relationship between the various embodiments and/or configurations discussed.

FIG. 1 is a cross-sectional view illustrating an optical structure 100 according to some embodiments of the present disclosure. It should be noted that some components of the optical structure 100 have been omitted in FIG. 1 for the sake of brevity. The optical structure 100 may be applied to backlight modules or illuminating light modules used in liquid crystal displays, but the present disclosure is not limited thereto.

Referring to FIG. 1, in some embodiments, the optical structure 100 includes a substrate 10. The substrate 10 may be a rigid circuit substrate. For example, the substrate 10 may include elemental semiconductors, such as silicon or germanium. Alternately, the substrate 10 may include compound semiconductors, such as silicon carbide (SiC), gallium arsenide (GaAs), indium arsenide (InAs) or indium phosphide (InP). Moreover, the substrate 10 may include alloy semiconductors, such as SiGe, SiGeC, GaAsP or GaInP, but the present disclosure is not limited thereto. the substrate 10 may include any other suitable semiconductor or a combination mentioned above. The substrate 10 may also be a flexible circuit substrate, a semiconductor-on-insulator (SOI) substrate, or a glass substrate.

Moreover, the substrate 10 may include various conductive parts (e.g., conductive lines or conductive vias). For example, the aforementioned conductive parts may include aluminum (Al), copper (Cu), tungsten (W), their respective alloys, any other suitable conductive material, or a combination thereof, but the present disclosure is not limited thereto.

Referring to FIG. 1, in some embodiments, the optical structure 100 includes a light-emitting element 20 disposed on the substrate 10. For example, the light-emitting element 20 may be a mini LED (i.e., light-emitting diode with a die size of from about 0.1 mm to about 0.3 mm) that may be applied to the backlight module of a direct back-lit liquid crystal display device, but the present disclosure is not limited thereto.

As shown in FIG. 1, in some embodiments, the light-emitting element 20 includes a chip 22 and a passivation layer 26 that covers the chip 22. For example, the chip 22 may include gallium phosphide (GaP), gallium aluminum arsenide (GaAlAs), gallium arsenide (GaAs), gallium nitride (GaN), or any other applicable material. Moreover, the chip 22 may have a PN junction inside and have unidirectional conductivity, but the present disclosure is not limited thereto. The passivation layer 26 may include, for example, an oxide such as silicon oxide, a nitride such as silicon nitride, the like, or a combination thereof, but the present disclosure is not limited thereto.

In some embodiments, the distance d between the first side 30T1 of the top portion 30T and the top surface 10T of the substrate 10 is about 0.3-3 times the width W22 of the chip 22.

As shown in FIG. 1, in some embodiments, the light-emitting element 20 further includes a light-converting layer 24 disposed between the chip 22 and the passivation layer 26. Moreover, in this embodiment, the chip 22 emits blue light, and the light-converting layer 24 includes yellow fluorescent material, but the present disclosure is not limited thereto. In some other embodiments, the light-converting layer 24 includes green fluorescent material or red fluorescent material.

Alternately, the light-converting layer 24 includes quantum dots. For example, the light-converting layer 24 may include red quantum dots or green quantum dots. The quantum dots may include cadmium selenide (CdSe), cadmium telluride (CdTe), cadmium sulfide (CdS), indium phosphide (InP), indium gallium phosphide (InGaP), or indium zinc phosphide (InZnP). In some other embodiments, the chip 22 itself emits red light, green light, or blue light, and there is no light-converting layer 24.

The light-converting layer 24 may be formed on the chip 22 by a deposition process and a patterning process, and the passivation layer 26 may be formed on the light-converting layer 24 by a deposition process and a patterning process. For example, the deposition process may include chemical vapor deposition (CVD), atomic layer deposition (ALD), molecular beam epitaxy (MBE), liquid phase epitaxy (LPE), the like, or a combination thereof, but the present disclosure is not limited thereto.

Referring to FIG. 1, in some embodiments, the optical structure 100 includes a cap 30 that is disposed on the substrate 10 and that covers the light-emitting element 20. In some embodiments, the cap 30 includes glass, poly (methyl methacrylate) (PMMA), polycarbonate (PC), silicone, epoxy resin, polyurethane (PU), any other applicable material, or a combination thereof, but the present disclosure is not limited thereto. In some embodiments, the cap 30 further includes zirconium oxide. For example, the cap may include 0.1 wt % to 8 wt % zirconium oxide, but the present disclosure is not limited thereto.

The cap 30 may be formed by a photoresist reflow method, a hot embossing method, any other applicable method, or a combination thereof. Moreover, the steps of forming the cap 30 may include a spin coating process, a lithography process, an etching process, any other applicable process, or a combination thereof. In this embodiment, the cap 30 is adhered to the substrate 10.

As shown in FIG. 1, in some embodiments, the cap 30 has a top portion 30T and a sidewall 30S connected to the top portion 30T. In this embodiment, the cap 30 is formed substantially as a cylinder with a circular top portion 30T and a cylindrical sidewall 30S, but the present disclosure is not limited thereto.

Referring to FIG. 1, in some embodiments, the optical structure 100 includes a first micro-structure 32 disposed on the first side 30T1 of the top portion 30T facing the light-emitting element 20, and the first micro-structure 32 is periodically arranged. As shown in FIG. 1, in some embodiments, the first micro-structure 32 has multiple micro-structure patterns 32S, and each micro-structure pattern 32S is formed as a truncated cone, a truncated pyramid, a trapezoidal pyramid, or a polygonal pyramid, but the present disclosure is not limited thereto. In some other embodiments, each micro-structure pattern 32S is formed as any other suitable shape depending on actual needs.

Moreover, as show in FIG. 1, in some embodiments, in the cross-sectional view, the micro-structure patterns 32S are mirror symmetric. Furthermore, in some embodiments, the symmetry axis of the micro-structure patterns 32S overlaps the central axis C of the light-emitting element 20. As shown in FIG. 1, in some embodiments, the distribution area of the first micro-structure 32 on the first side 30T1 of the top portion 30T is larger than the area of the top surface 22T of the chip 22.

Referring to FIG. 1, in some embodiments, the optical structure 100 includes a second micro-structure 34 disposed on the second side 30T2 of the top portion 30T facing away from the light-emitting element 20, and the second micro-structure 34 is periodically arranged. Similarly, as show in FIG. 1, the second micro-structure 34 has multiple micro-structure patterns 34S, and in the cross-sectional view, the micro-structure patterns 34S are mirror symmetric. Furthermore, in some embodiments, the symmetry axis of the micro-structure patterns 34S overlaps the central axis C of the light-emitting element 20.

As shown in FIG. 1, in this embodiment, in the cross-sectional view, each micro-structure pattern 34S is formed as a triangle, but the present disclosure is not limited thereto. In some other embodiments, in the cross-sectional view, each micro-structure pattern 34S is formed as a quadrilateral or any other suitable shape.

Figure 2:
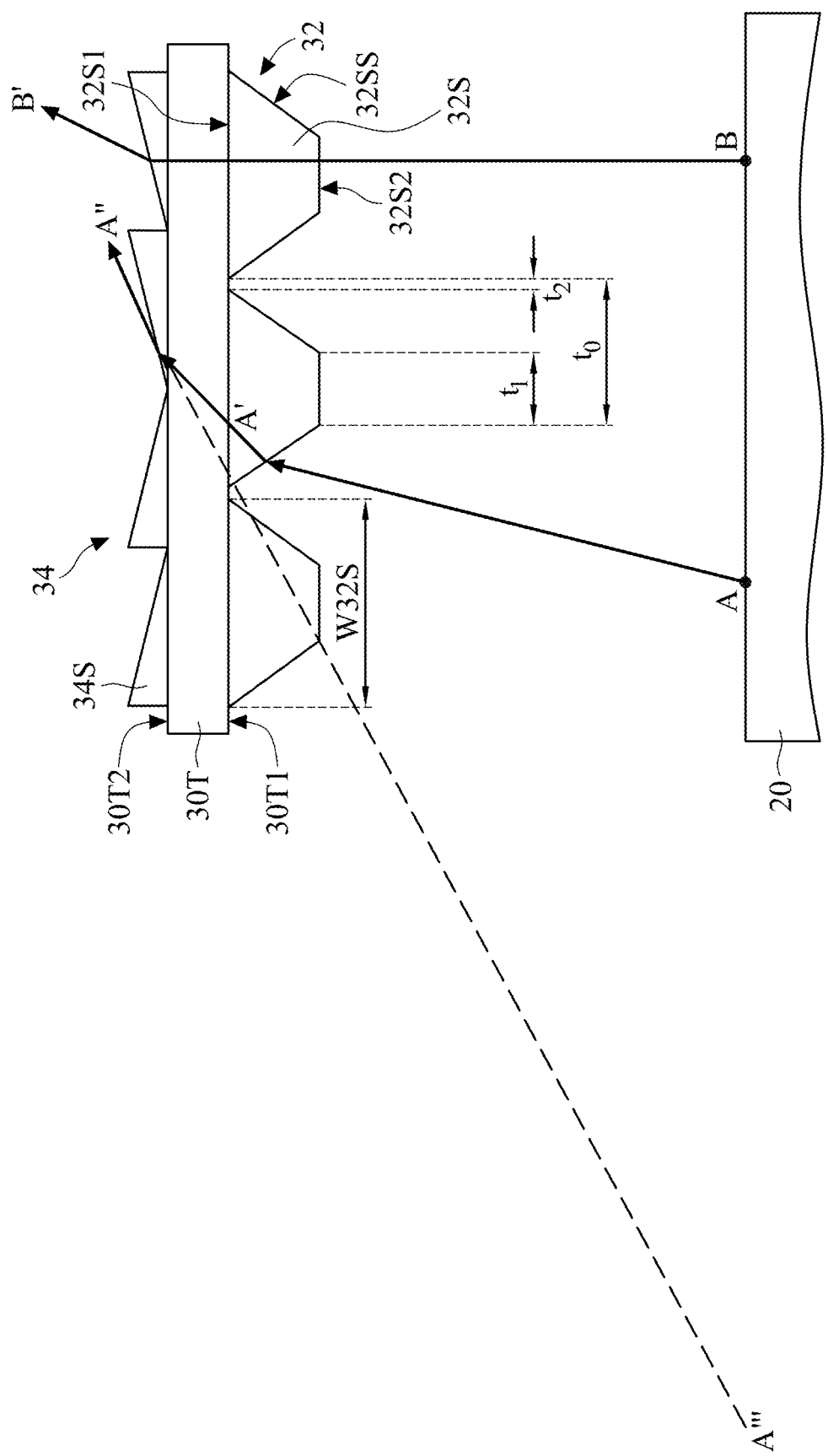
FIG. 2 is a partially enlarged view illustrating the top portion of the cap, the first micro-structure, and the second micro-structure according to some embodiments of the present disclosure.

FIG. 2 is a partially enlarged view illustrating the top portion 30T of the cap 30, the first micro-structure 32, and the second micro-structure 34 according to some embodiments of the present disclosure. For example, FIG. 2 may show an enlarged view of region E in FIG. 1, but the present disclosure is not limited thereto. Referring to FIG. 2, in the cross-sectional view, each micro-structure pattern 32S is formed as an isosceles trapezoid. The isosceles trapezoid has a first base 32S1 connected to the top portion 30T of the cap 30, a second base 32S2 facing away from the top portion 30T of the cap 30, and two sides 32SS connected to the first base 32S1 and the second base 32S2.

In some embodiments, the maximum width W32S of each micro-structure pattern 32S is between about 0.01 mm and about 0.3 mm. As shown in FIG. 2, the width of the second base 32S2 is t1, and the minimum distance between two adjacent micro-structure patterns 32S is t2. The sum of the normal projection of the second base 32S2 on the top portion 30T, the normal projection of one side 32SS on the top portion 30T, and the minimum distance between two adjacent micro-structure patterns 32S is t0. In some embodiments, t0, t1, and t2 match the following formula: $0.1<(t1+t2)/t0<0.9$.

As shown in FIG. 2, after passing through the slanted side 32SS of the micro-structure pattern 32S, light emitted from point A will change its direction towards A', whereas after passing through the second base 32S2 of the micro-structure pattern 32S, light emitted from point B will change its direction towards B'. Therefore, by adjusting the shape of the first micro-structure 32, it is possible to modify the light distribution.

Moreover, after passing through the slanted side 32SS of the micro-structure pattern 32S and the slanted edges of the micro-structure pattern 34S, light emitted from point A will change its direction towards A". Extending light ray A" backward may be visualized as if it originates from point A'". This effect makes the light source (i.e., light-emitting element 20) appear larger. The position of point A'" is determined by the distance d between the first side 30T1 of the top portion 30T and the top surface 10T of the substrate 10. As the distance d increases, point A'" moves farther away from point A. Consequently, this may be interpreted as an enlarged light source.

Furthermore, due to the periodic arrangement of the first micro-structure 32, when the light-emitting element 20 (i.e., light source) is slightly offset horizontally from the periodic first micro-structure 32, the behavior of light deflection remains consistent as the light rays reach the first micro-structure 32. This aspect allows for a greater tolerance in the alignment assembly between the first micro-structure 32 and the light-emitting element 20.

Figure 3A:
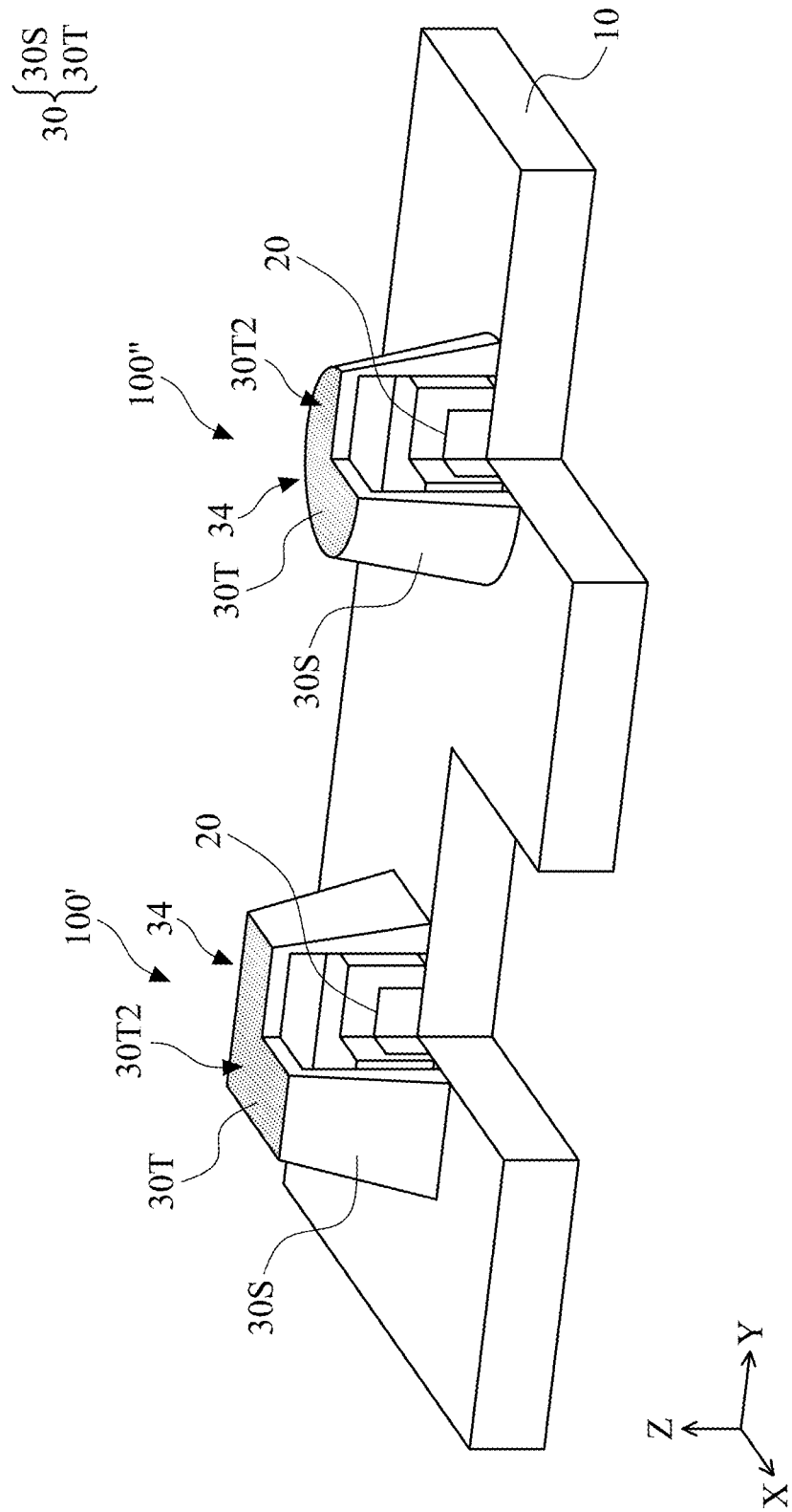
FIG. 3A is a three-dimensional schematic diagram illustrating optical structures according to some embodiments of the present disclosure, in which partial cross-sections of the optical structures are also shown.
Figure 3B:
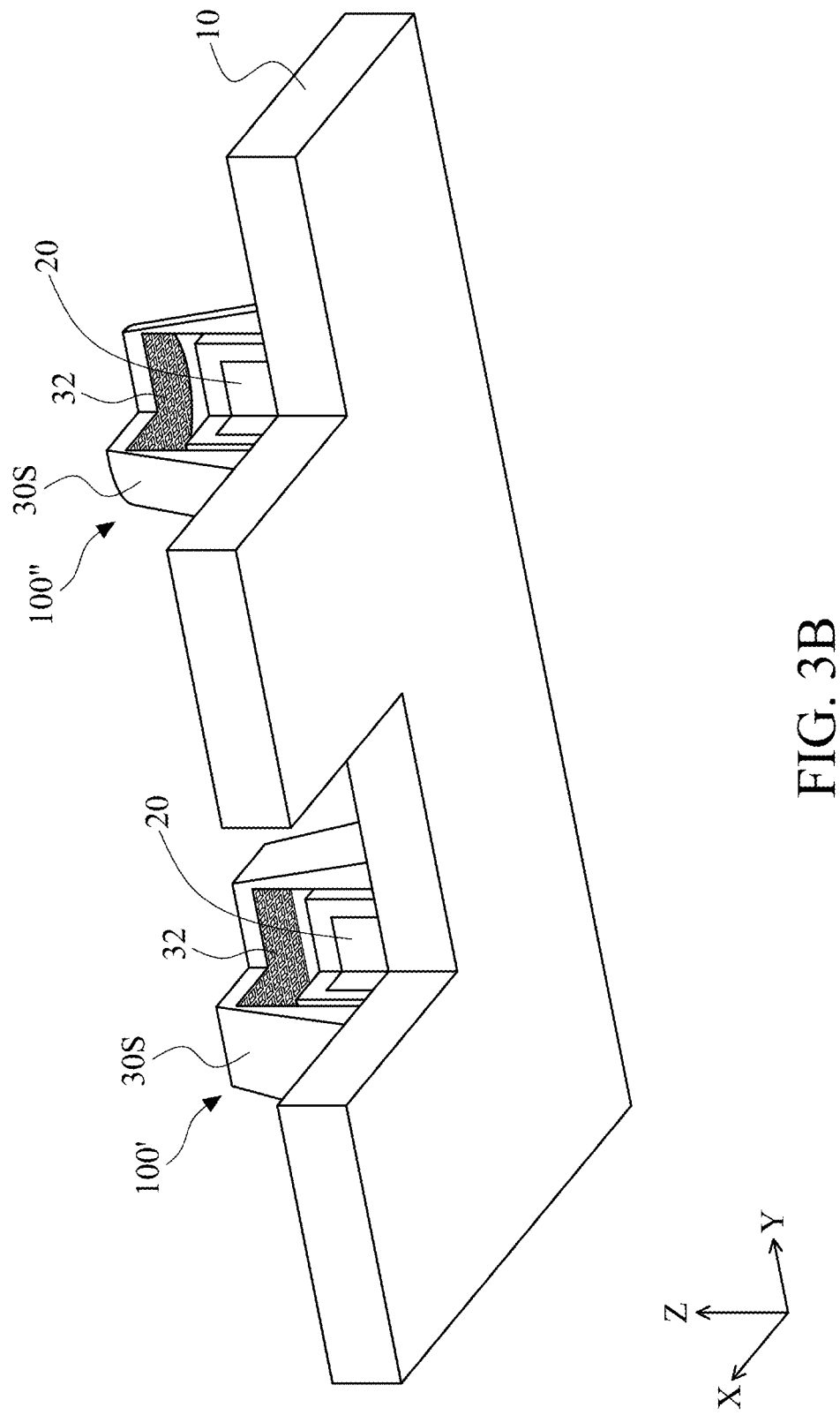
FIG. 3B shows a three-dimensional schematic diagram of the optical structures from another angle.

FIG. 3A is a three-dimensional schematic diagram illustrating optical structures 100', 100" according to some embodiments of the present disclosure, in which partial cross-sections of the optical structures 100', 100" are also shown. FIG. 3B shows a three-dimensional schematic diagram of the optical structures 100', 100" from another angle. For example, the optical structures 100', 100" may have a structure and cross-sectional view similar to the optical structures 100 shown in FIG. 1, but the present disclosure is not limited thereto.

As shown in FIG. 3A and FIG. 3B, in this embodiment, the optical structures 100', 100" include a substrate 10. As shown in FIG. 3A, in this embodiment, the second side 30T2 of the top portion 30T is formed as a rectangle and the sidewalls 30S have four trapezoidal surfaces in the optical structures 100'. Moreover, as shown in FIG. 3A, the second side 30T2 of the top portion 30T is formed as a circle and the sidewall 30S is a part of a cone in the optical structures 100".

Figure 4:
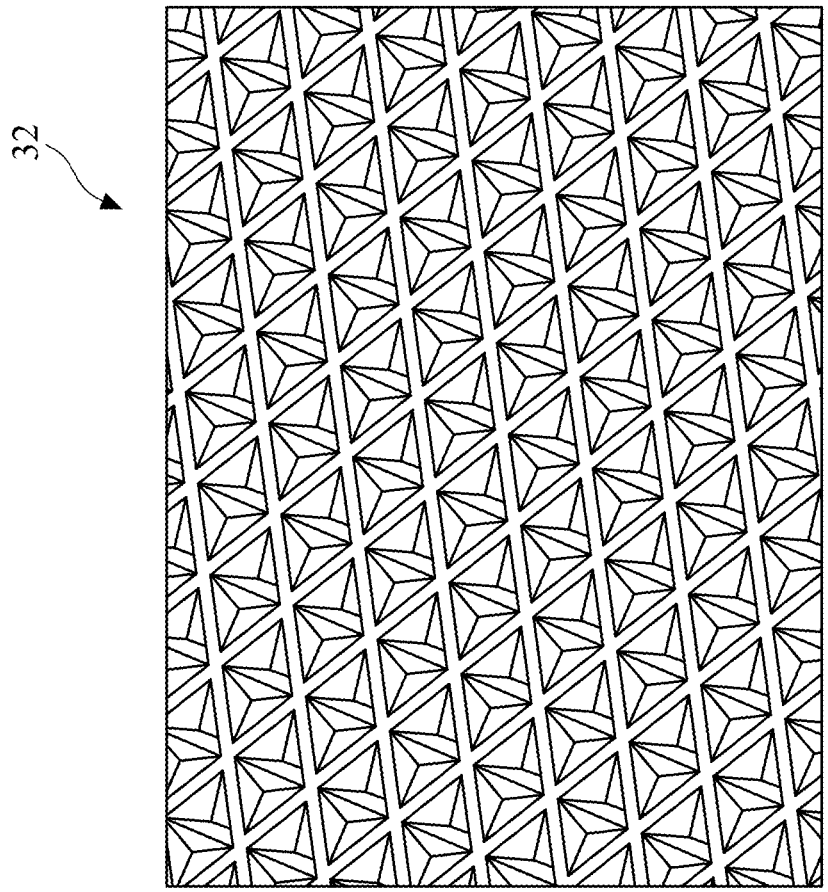
FIG. 4 is a three-dimensional schematic diagram of the first micro-structure according to some embodiments of the present disclosure.
Figure 5C:
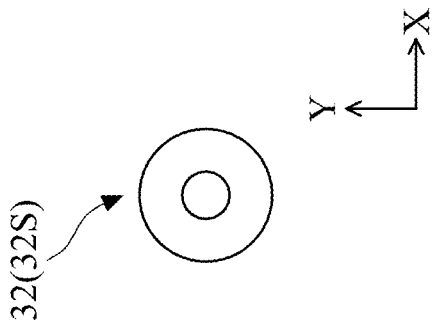
FIG. 5A to FIG. 5C illustrate the first micro-structure (micro-structure pattern) viewed from the light-emitting element to the cap according to different embodiments of the present disclosure.
Figure 5B:
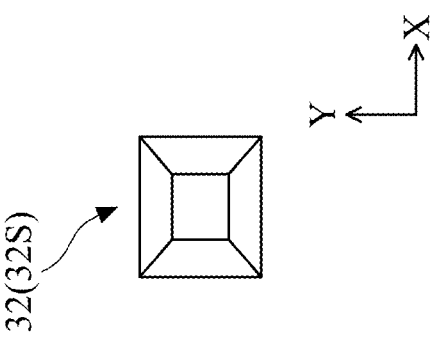
Figure 5A:
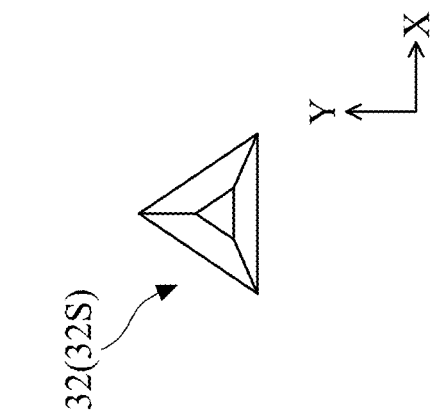

FIG. 4 is a three-dimensional schematic diagram of the first micro-structure 32 according to some embodiments of the present disclosure. FIG. 5A to FIG. 5C illustrate the first micro-structure 32 (micro-structure pattern 32S) viewed from the light-emitting element 20 to the cap 30 according to different embodiments of the present disclosure.

Referring to FIG. 5A, in this embodiment, when viewed from the light-emitting element 20 to the cap 30, the first micro-structure 32 is formed as a triangular pyramid with a flat head. Referring to FIG. 5B, in this embodiment, when viewed from the light-emitting element 20 to the cap 30, the first micro-structure 32 is formed as a quadrangular pyramid with a flat head. Referring to FIG. 5C, in this embodiment, when viewed from the light-emitting element 20 to the cap 30, the first micro-structure 32 is formed as a conical pyramid with a flat head. However, the present disclosure is not limited to FIG. 5A to FIG. 5C. In some other embodiments, when viewed from the light-emitting element 20 to the cap 30, the first micro-structure 32 is formed as a polygonal pyramid or any other suitable three-dimensional structure.

Figure 6:
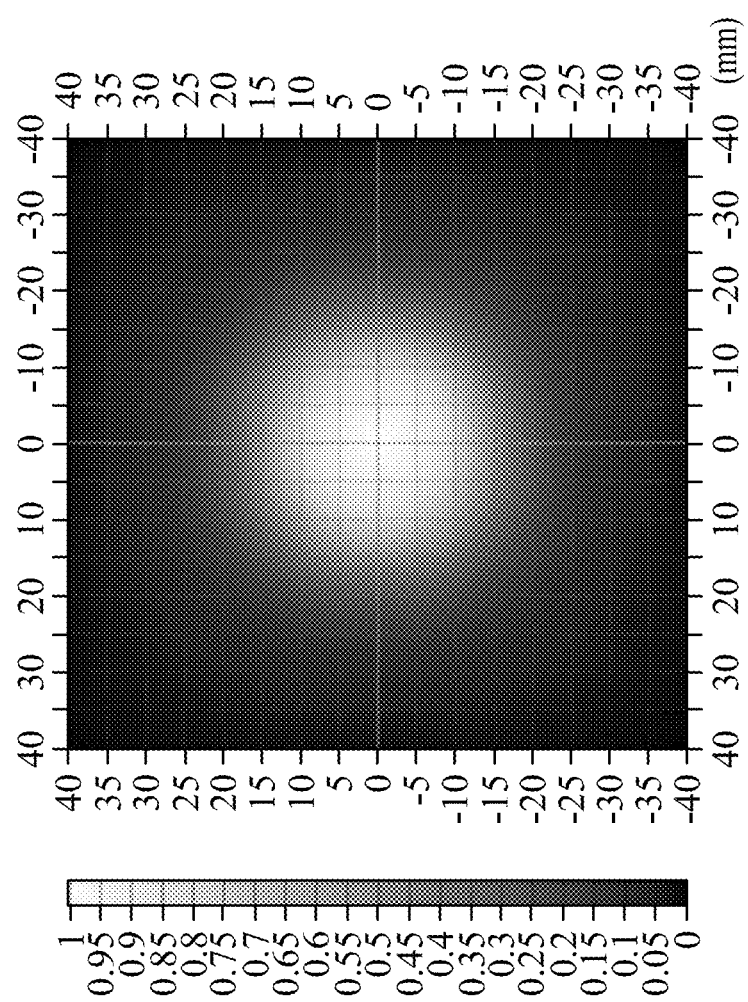
FIG. 6 is a light spot illumination distribution diagram when the optical structure emits light.
Figure 7:
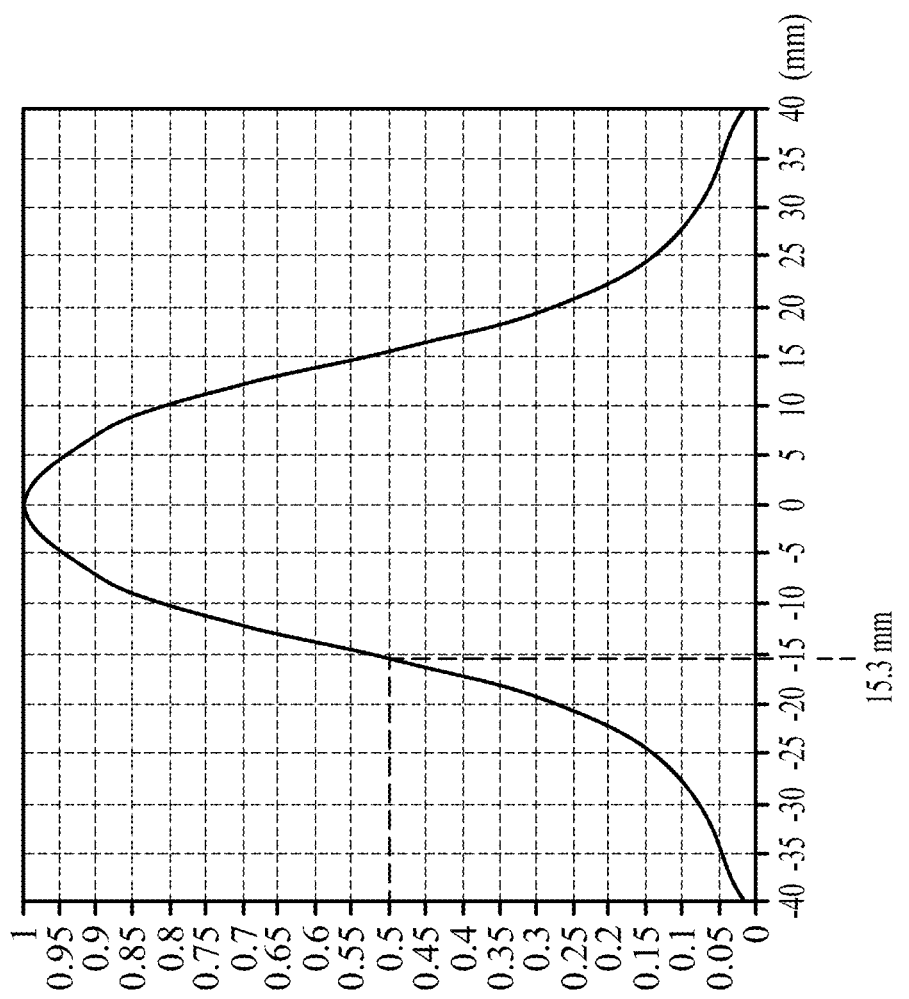
FIG. 7 is a light spot profile illumination distribution diagram of the optical structure.

FIG. 6 is a light spot illumination distribution diagram when the optical structure 100 emits light, in which both the horizontal axis and the vertical axis represent length (unit: mm) and the grayscale color represents relative intensity. FIG. 7 is a light spot profile illumination distribution diagram of the optical structure 100, in which the horizontal axis represents length (unit: mm) and the vertical axis represents relative intensity.

As shown in FIG. 6 and FIG. 7, since the optical structure 100 includes the first micro-structure 32 and the second micro-structure 34, the simulation result of which shows that the 50% intensity radius of the light spot reaches 15.3 mm in OD10 (optical distance) (i.e., the distance between the substrate 10 and the optical film above). This exceeds the light spot size of known optical structures (which do not include any micro-structures), where the 50% intensity radius is 11.4 mm. Therefore, the optical structure 100, according to the embodiments of the present disclosure, may be utilized for an LED backlight structure that has HP in the range from about 1:3 to about 1:2.5. Here, HP is the ratio of the optical distance to the pitch of the optical structures 100, and the pitch of the optical structures 100 may be defined as the distance between the centers of two adjacent optical structures 100.

Figure 8:
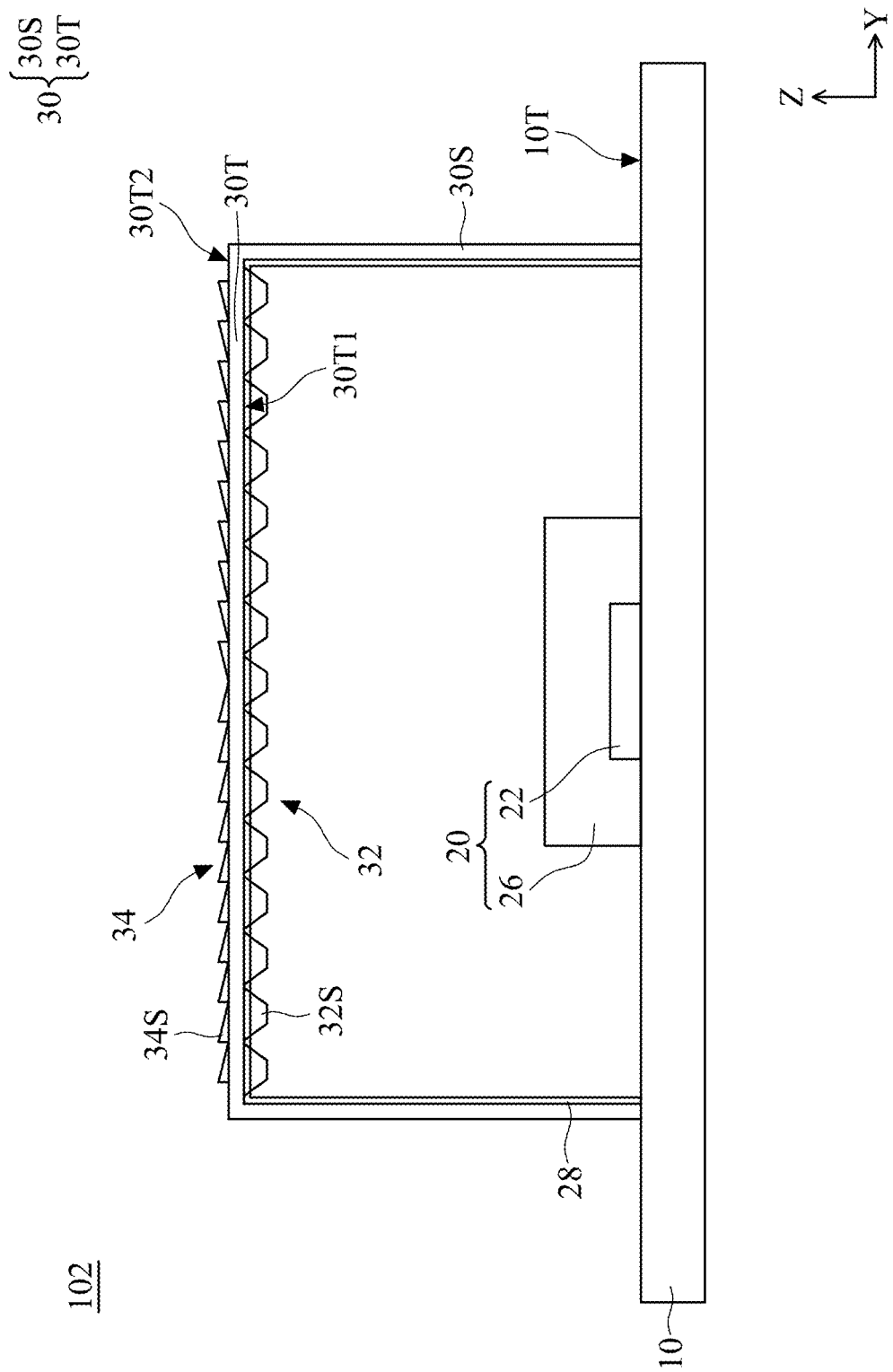
FIG. 8 is a cross-sectional view illustrating an optical structure according to some embodiments of the present disclosure.

FIG. 8 is a cross-sectional view illustrating an optical structure 102 according to some embodiments of the present disclosure. Similarly, some components of the optical structure 102 have been omitted in FIG. 8 for the sake of brevity.

Referring to FIG. 8, in some embodiments, the optical structure 102 includes a substrate 10 and a light-emitting element 20 disposed on the substrate 10. The optical structure 102 also includes a cap 30 that is disposed on the substrate 10 and that covers the light-emitting element 20. The cap 30 has a top portion 30T and a sidewall 30S connected to the top portion 30T. The optical structure 102 further includes a first micro-structure 32 disposed on the first side 30T1 of the top portion 30T facing the light-emitting element 20. The first micro-structure 32 is periodically arranged.

As shown in FIG. 8, in this embodiment, the optical structure 102 includes a second micro-structure 34 disposed on the second side 30T2 of the top portion 32T facing away from the light-emitting element 20. The second micro-structure 34 is periodically arranged. Moreover, in this embodiment, the light-emitting element 20 includes a chip 22 and a passivation layer 26 that covers the chip 22. In more detail, the passivation layer 26 may be in direct contact with the chip 22.

As shown in FIG. 8, in this embodiment, the optical structure 102 further includes a light-converting film 28 disposed on the inner surface of the cap 30. For example, the chip 22 may emit blue light and the light-converting film 28 may include yellow fluorescent material, but the present disclosure is not limited thereto.

Figure 9:
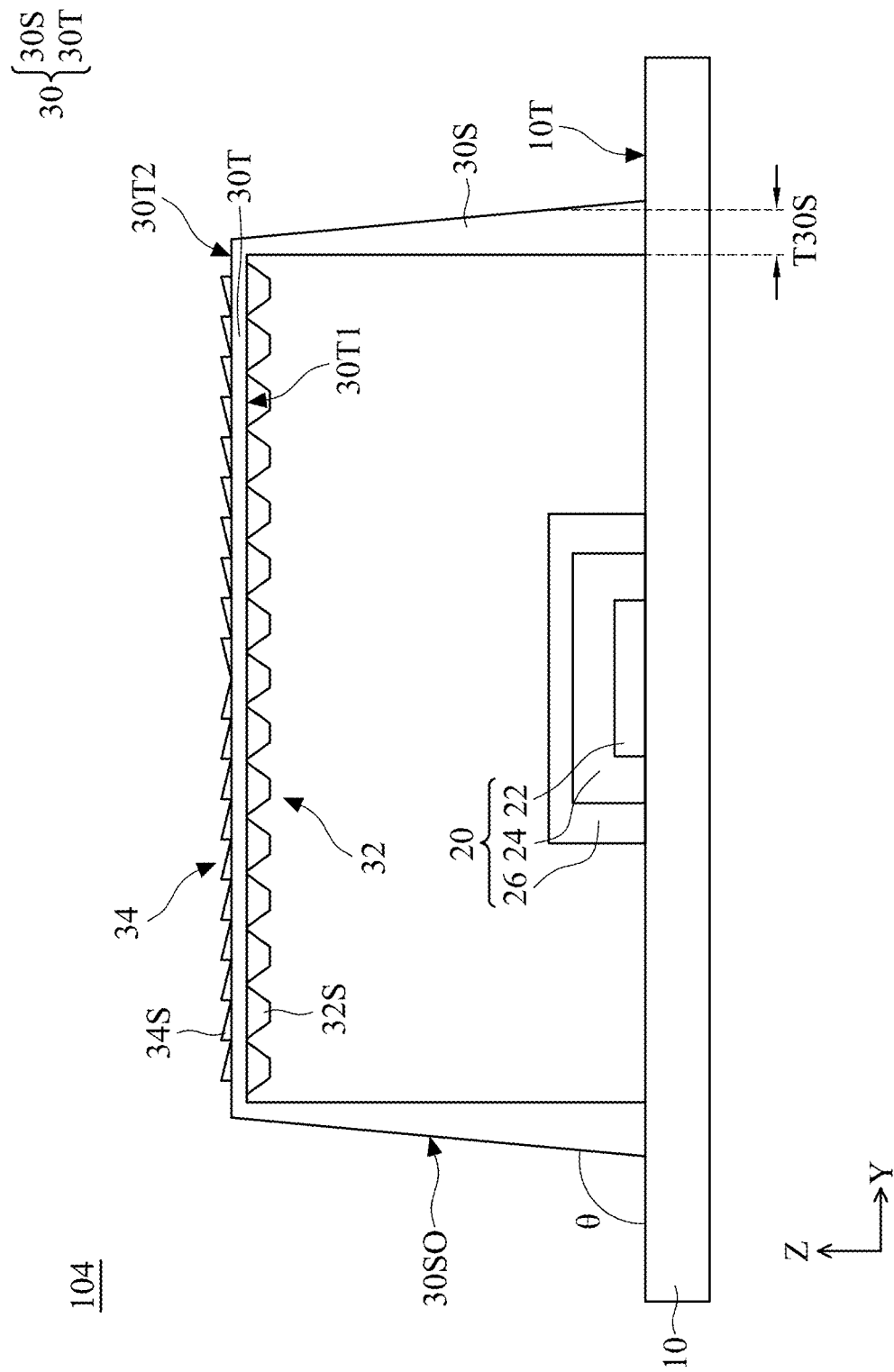
FIG. 9 is a cross-sectional view illustrating an optical structure according to some embodiments of the present disclosure.

FIG. 9 is a cross-sectional view illustrating an optical structure 104 according to some embodiments of the present disclosure. Similarly, some components of the optical structure 104 have been omitted in FIG. 9 for the sake of brevity.

Referring to FIG. 9, in some embodiments, the optical structure 104 includes a substrate 10 and a light-emitting element 20 disposed on the substrate 10. The optical structure 104 also includes a cap 30 that is disposed on the substrate 10 and that covers the light-emitting element 20. The cap 30 has a top portion 30T and a sidewall 30S connected to the top portion 30T. The optical structure 104 further includes a first micro-structure 32 disposed on the first side 30T1 of the top portion 30T facing the light-emitting element 20. The first micro-structure 32 is periodically arranged.

As shown in FIG. 9, in this embodiment, the thickness T30S of the sidewall 30S of the cap 30 gets thicker towards the substrate 10. In other words, the thickness T30S of the sidewall 30S of the cap 30 is variable. In a cross-sectional view, the sidewall 30S of the cap 30 is trapezoidal with a narrow top and a wide bottom, but the present disclosure is not limited thereto.

Moreover, as shown in FIG. 9, in this embodiment, in a cross-sectional view, the included angle θ between the outer surface 30SO of the sidewall 30S of the cap 30 and the top surface 10T of the substrate 10 is between about 90° and about 120°. In other words, the cap 30 may have a sloped sidewall 30S, which may facilitate the manufacture of the cap 30 and provide deflection of the light emitted from the side of the light-emitting element 20.

Figure 10:
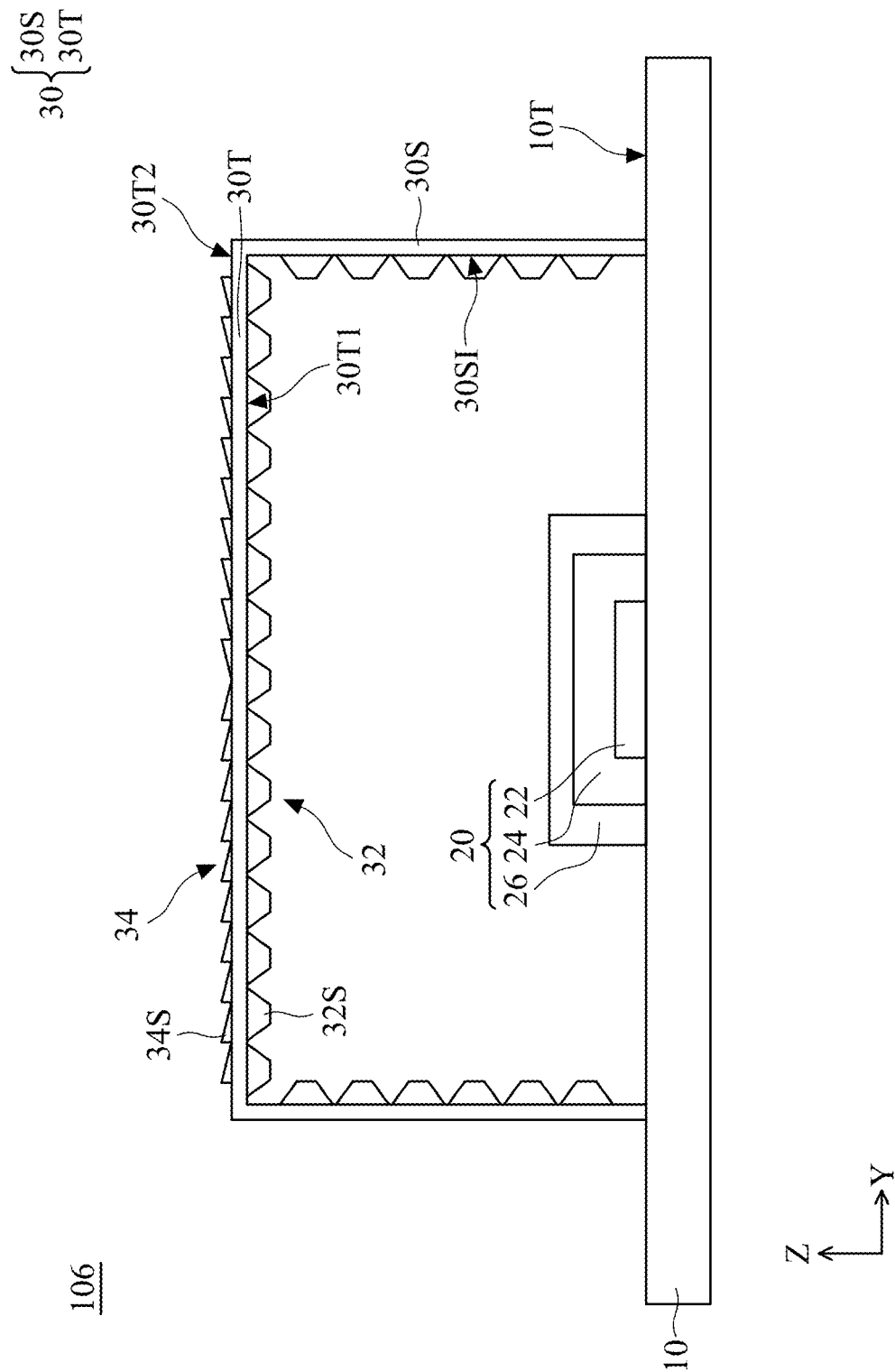
FIG. 10 is a cross-sectional view illustrating an optical structure according to some embodiments of the present disclosure.

FIG. 10 is a cross-sectional view illustrating an optical structure 106 according to some embodiments of the present disclosure. Similarly, some components of the optical structure 106 have been omitted in FIG. 10 for the sake of brevity.

Referring to FIG. 10, in some embodiments, the optical structure 106 includes a substrate 10 and a light-emitting element 20 disposed on the substrate 10. The optical structure 106 also includes a cap 30 that is disposed on the substrate 10 and that covers the light-emitting element 20. The cap 30 has a top portion 30T and a sidewall 30S connected to the top portion 30T. The optical structure 106 further includes a first micro-structure 32 disposed on the first side 30T1 of the top portion 30T facing the light-emitting element 20. The first micro-structure 32 is periodically arranged.

As shown in FIG. 10, in this embodiment, the first micro-structure 32 is also disposed on the inner surface 30SI of the sidewall 30S of the cap 30, which may provide deflection of the light emitted from the side of the light-emitting element 20.

Figure 11:
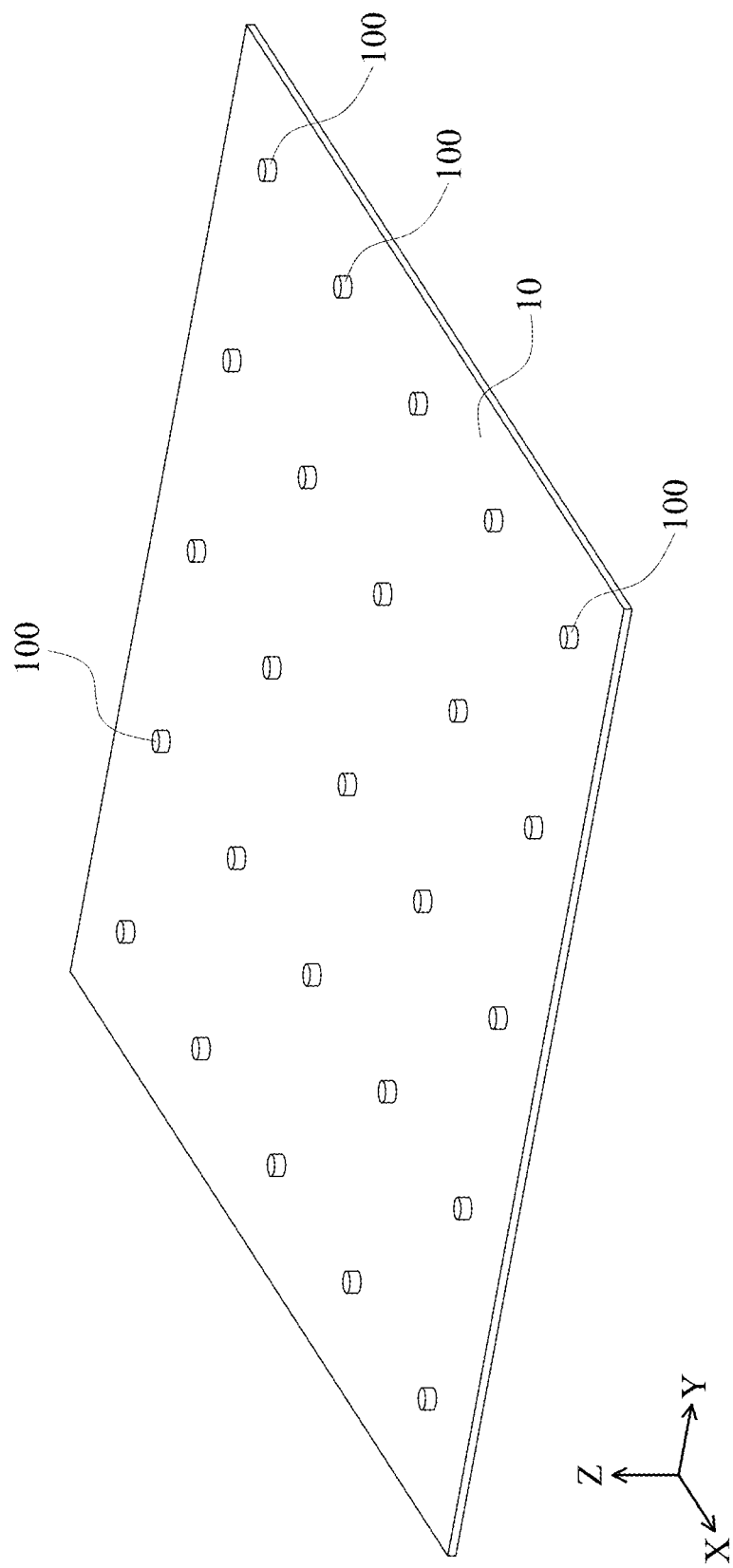
FIG. 11 is a three-dimensional schematic diagram illustrating multiple optical structures that share a substrate according to some embodiments of the present disclosure.
Figure 12A:
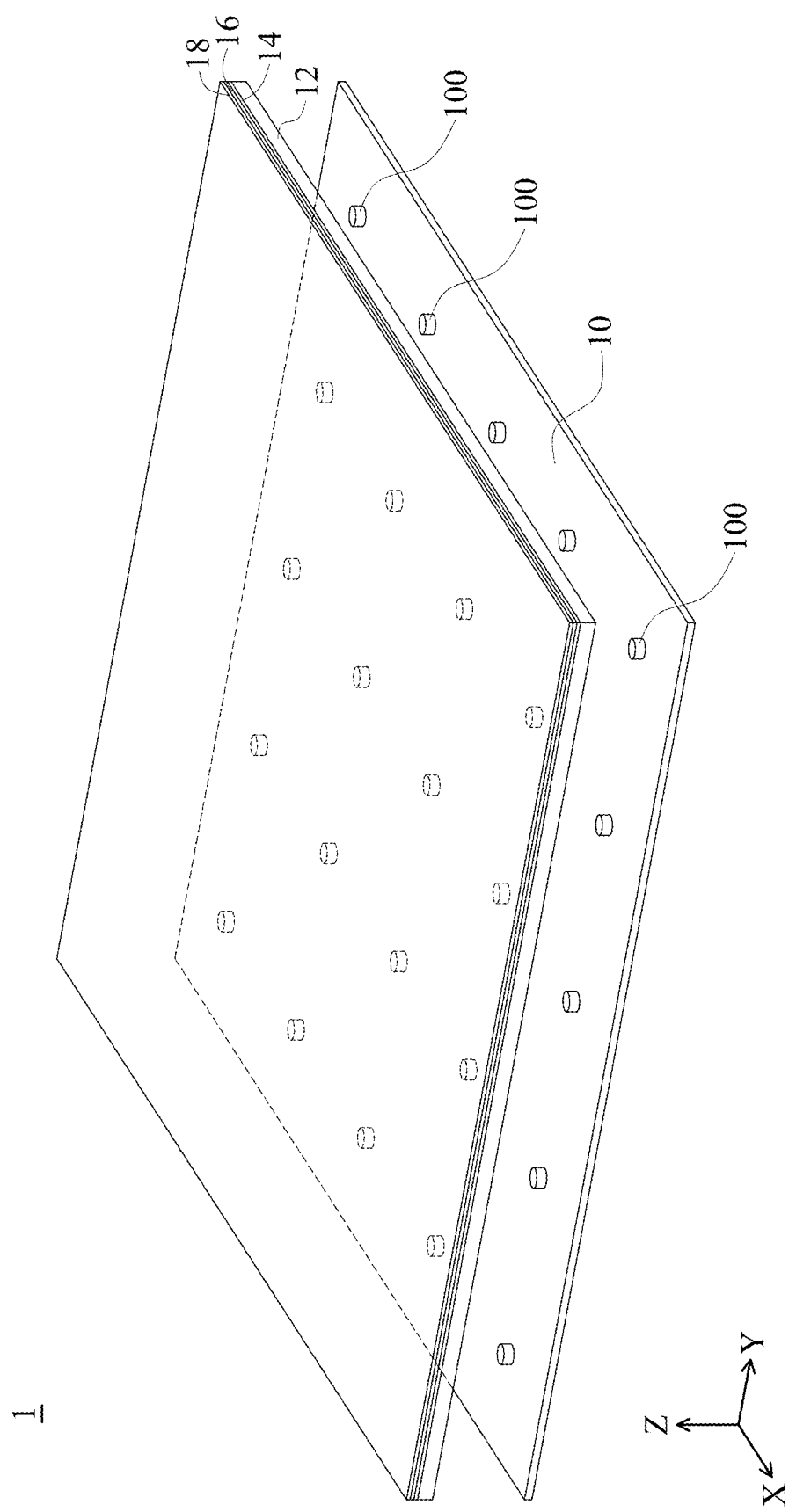
FIG. 12A is a three-dimensional schematic diagram illustrating a backlight module that includes multiple optical structures according to some embodiments of the present disclosure.
Figure 12B:
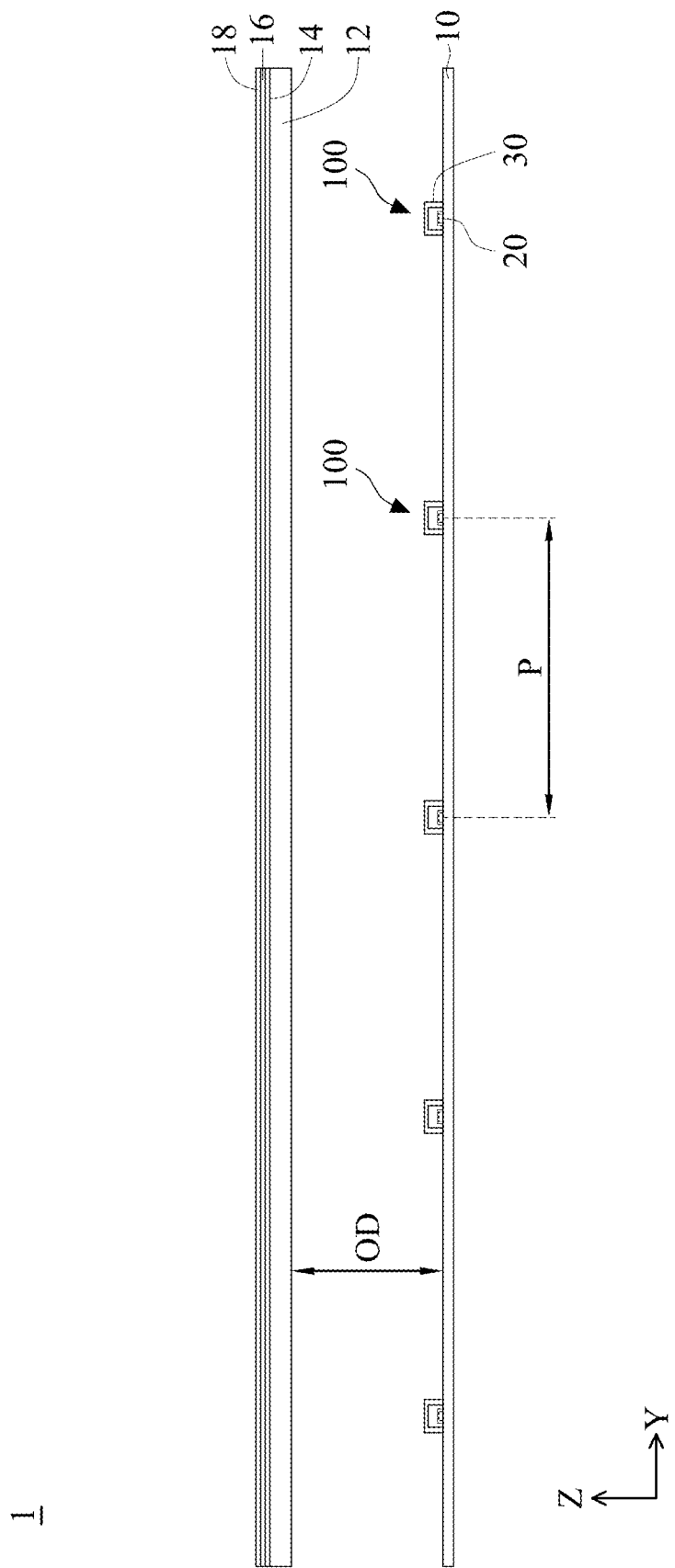
FIG. 12B is a partial cross-sectional view of the backlight module of FIG. 12A.

FIG. 11 is a three-dimensional schematic diagram illustrating multiple optical structures 100 that share a substrate 10 according to some embodiments of the present disclosure. FIG. 12A is a three-dimensional schematic diagram illustrating a backlight module 1 that includes multiple optical structures 100 according to some embodiments of the present disclosure. FIG. 12B is a partial cross-sectional view of the backlight module 1 of FIG. 12A. It should be noted that the optical structure 100 shown in FIG. 11 to FIG. 12A may be replaced with the optical structure 102 shown in FIG. 8, the optical structure 104 shown in FIG. 9, or the optical structure 106 shown in FIG. 10.

As shown in FIG. 11, in some embodiments, multiple optical structures 100 may be arranged in an array. As shown in FIG. 12A and FIG. 12B, in some embodiments, the backlight module 1 includes multiple optical structures 100 arranged in an array and share the substrate 10. The backlight module 1 also includes a diffusion plate 12 disposed over the optical structures 100 and a diffusion film 14 disposed on the diffusion plate 12. The backlight module 1 further includes multiple optical films 16, 18 disposed on the diffusion plate 12. For example, the optical films 16, 18 may be brightness enhancement film (BEG), and (the surface of) the substrate 10 may reflect lights emitted from the optical structures 100, but the present disclosure is not limited thereto.

As shown in FIG. 12B, in this embodiment, the optical distance OD may be the distance between the substrate 10 and the diffusion film 14, and the pitch P of the optical structures 100 is defined as the distance between the centers of two adjacent optical structures 100. In some embodiments, the ratio of the optical distance OD to the pitch P of the optical structures 100 may be larger than 1:3. In some embodiments, the ratio of the optical distance OD to the pitch P of the optical structures 100 may be in the range from about 1:3 to about 1:2.5. That is, the backlight module 1 may have HP in the range from about 1:3 to about 1:2.5.

As noted above, the optical structure according to the embodiments of the present disclosure includes at least one micro-structure. The micro-structure may widen the beam angle of optical structures, allowing optical devices (e.g., backlight module) that use the optical structures to maintain good light uniformity even when the spacing between multiple optical structures increases.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure. Therefore, the scope of protection should be determined through the claims. In addition, although some embodiments of the present disclosure are disclosed above, they are not intended to limit the scope of the present disclosure.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Thus, discussions of the features and advantages, and similar language, throughout this specification may, but do not necessarily, refer to the same embodiment.

Furthermore, the described features, advantages, and characteristics of the disclosure may be combined in any suitable manner in one or more embodiments. One skilled in the relevant art will recognize, in light of the description herein, that the disclosure can be practiced without one or more of the specific features or advantages of a particular embodiment. In other instances, additional features and advantages may be recognized in certain embodiments that may not be present in all embodiments of the disclosure.

What is claimed is:

1. An optical structure, comprising:
   a substrate;
   a light-emitting element disposed on the substrate;
   a cap disposed on the substrate and covering the light-emitting element, wherein the cap has a top portion and a sidewall connected to the top portion;
   a first micro-structure disposed on a first side of the top portion facing the light-emitting element, wherein the first micro-structure is periodically arranged; and
   a light-converting film disposed on an inner surface of the cap.

2. The optical structure as claimed in claim 1, further comprising:
   a second micro-structure disposed on a second side of the top portion facing away from the light-emitting element, wherein the second micro-structure is periodically arranged.

3. The optical structure as claimed in claim 2, wherein in a cross-sectional view, the second micro-structure has a plurality of micro-structure patterns, and the micro-structure patterns are mirror symmetric.

4. The optical structure as claimed in claim 3, wherein in the cross-sectional view, a symmetry axis of the micro-structure patterns overlaps a central axis of the light-emitting element.

5. The optical structure as claimed in claim 3, wherein in the cross-sectional view, each of the micro-structure patterns is formed as a triangle or a quadrilateral.

6. The optical structure as claimed in claim 1, wherein the first micro-structure has a plurality of micro-structure patterns, and each of the micro-structure patterns is formed as a truncated cone, a truncated pyramid, a trapezoidal pyramid, or a polygonal pyramid.

7. The optical structure as claimed in claim 6, wherein a maximum width of each of the micro-structure patterns is between 0.01 mm and 0.3 mm.

8. The optical structure as claimed in claim 6, wherein in a cross-sectional view, each of the micro-structure patterns is formed as an isosceles trapezoid that has a first base connected to the top portion, a second base facing away from the top portion, and two sides connected to the first base and the second base, a width of the second base is t1, a minimum distance between adjacent two of the micro-structure patterns is t2, the sum of a normal projection of the second base on the top portion, a normal projection of one of the sides on the top portion, and the minimum distance between adjacent two of the micro-structure patterns is to, where t0, t1, and t2 match the following formula: $0.1<(t1+t2)/t0<0.9$.

9. The optical structure as claimed in claim 1, wherein when viewed from the light-emitting element to the cap, the first micro-structure is formed as a plurality of triangular pyramids with flat heads, quadrangular pyramids with flat heads, conical pyramids with flat heads, or polygonal pyramids.

10. The optical structure as claimed in claim 1, wherein the light-emitting element comprises a chip and a passivation layer covering the chip.

11. The optical structure as claimed in claim 10, wherein a distance between the first side and a top surface of the substrate is 0.3-3 times a width of the chip.

12. The optical structure as claimed in claim 10, wherein the light-emitting element further comprises a light-converting layer disposed between the chip and the passivation layer.

13. The optical structure as claimed in claim 12, wherein the chip emits blue light and the light-converting layer comprises yellow fluorescent material.

14. The optical structure as claimed in claim 10, wherein a distribution area of the first micro-structure on the first side is larger than an area of the top surface of the chip.

15. The optical structure as claimed in claim 1, wherein a thickness of the sidewall gets thicker towards the substrate.

16. The optical structure as claimed in claim 1, wherein in a cross-sectional view, an included angle between an outer surface of the sidewall and a top surface of the substrate is between 90° and 120°.

17. The optical structure as claimed in claim 1, wherein the first micro-structure is also disposed on an inner surface of the sidewall.

18. The optical structure as claimed in claim 1, wherein the cap comprises poly (methyl methacrylate), polycarbonates, or silicone.

19. The optical structure as claimed in claim 1, wherein the cap further comprises zirconium oxide.

* * * * *